United States Patent [19]
Froeberg et al.

[11] Patent Number: 6,043,778
[45] Date of Patent: Mar. 28, 2000

[54] NAVIGATION SYSTEM AND ORIENTATION SYSTEM INCORPORATING SOLAR SIGHTING

[75] Inventors: Peter L. Froeberg, Cupertino; Greg T. Kremer, San Jose, both of Calif.

[73] Assignee: Trimble Navigation Limited, Sunnyvale, Calif.

[21] Appl. No.: 08/998,980

[22] Filed: Dec. 29, 1997

[51] Int. Cl.[7] .............................. H04B 7/185; G01S 5/02
[52] U.S. Cl. ................ 342/357.14; 342/357.13; 701/222
[58] Field of Search ................ 342/357.13, 357.14; 701/222

[56] References Cited

U.S. PATENT DOCUMENTS 5,109,346  4/1992  Wertz .
5,410,143  4/1995  Jones .

*Primary Examiner*—Theodore M. Blum
*Attorney, Agent, or Firm*—Wagner, Murabito & Hao LLP

[57] ABSTRACT

A method and apparatus for providing orientation using a solar sighting device. In one embodiment, sighting of the sun and the moon and stars is used to determine orientation. The input from the solar sighting system is input into a processing system along with global positioning system data. Ephemerides stored in the processing system are used in conjunction with time signals from global positioning system data and position determined from global positioning system data so as to determine orientation. This orientation is then used to determine the direction of movement in a vehicle navigation system and is used to orient an optical sighting system.

20 Claims, 6 Drawing Sheets

NAVIGATION SYSTEM AND ORIENTATION SYSTEM INCORPORATING SOLAR SIGHTING

TECHNICAL FIELD

The present claimed invention relates to the field of navigation systems and location determination systems. More specifically, the present claimed invention relates to an improved navigation system and orientation system which use sighting of a reference object for orientation.

BACKGROUND ART

Using celestial bodies and landmarks to obtain orientation has been used for many years to orient travelers, particularly in ships and in other vessels and vehicles. Also, compasses have been used for the purpose of orientation. In addition, compasses have been used in combination with the sighting of celestial bodies to determine orientation.

Compasses are not accurate in many instances due to interference from nearby magnets, magnetic devices and conductors. This is particularly true with respect to the use of magnets in vehicles such as cars and trucks since there is quite a lot of metal in and around the vehicle and since vehicle's typically contain magnetic devices and electrical devices that interfere with the measurement of magnetic orientation.

Though sighting of celestial bodies and landmarks has been used for centuries for determining orientation, prior art systems for determining orientation of vehicles using celestial bodies and landmarks only determine a rough orientation. Typically such orientation methods involve the sighting the celestial object optically so as to determine a rough estimate of north, south or west directions. More sophisticated methods used by mariners included the use of a sextant which was used to sight stars for a more exact orientation.

Recently, in-vehicle navigation systems have been used which determine position and travel path of the vehicle using position determining signals transmitted from satellites. These navigation systems typically include a receiver which receives position determination signals from satellites, a microprocessor, a display and a map database. Typically, the position determination signals are received from global positioning system (GPS) satellites which are a part of the US GPS satellite network. The position determination signals are processed via an electronics package located within the receiver or by the microprocessor unit.

These systems typically include a display screen which displays a map including travel paths such as streets, roads and highways. Many of these systems display the location of the vehicle as an icon on the display and show the movement of the vehicle by moving the icon on the display. These navigation systems typically determine orientation by calculating the direction of movement of the vehicle. However, the GPS system does not provide orientation information. Orientation is predicted using previously obtained position data.

Position determining systems can accurately predict orientation when the vehicle is moving rapidly in a straight line when signals from multiple satellite vehicles are received in an uninterrupted fashion. However, when obstructions and/or atmospheric conditions and/or selective availability either do not allow for the calculation of position, or introduce error into the position determination calculation, orientation is either totally unavailable or the calculated orientation is incorrect.

Dead reckoning systems have been incorporated into GPS systems for determining orientation when orientation determined by the GPS system is either incorrect or is unavailable. Dead reckoning systems work well in situations where position determination is unavailable or incorrect for short periods of time. However, such systems typically use gyroscopic devices to determine orientation. The gyroscopic devices used in GPS systems drift over time. Thus, as time passes, the orientation becomes less and less accurate. FIG. 1 shows an example of a vehicle 1 which includes a vehicle navigation system with dead reckoning. Vehicle 1 is shown to be traveling along street A at the intersection of street A and street B. As vehicle A continues to travel along street A, the orientation and position determined using the dead reckoning system drifts, showing the position to be outside of the actual travel path as illustrated by dashed line 2. In the example shown in prior art FIG. 1, a new position is obtained at the intersection of street A and street C. The new position is then used to calculate direction of travel which is used to correct for gyroscopic drift. However, the drift of the gyroscope will continue to degrade the accuracy of the determined orientation and the determined position as shown by dashed line 4 until another new position is accurately obtained and correction of gyroscopic drift is made as shown by line 5. Though orientation is shown to be determined accurately by the movement of the vehicle as represented by arrow 4 and arrow 5, often this is not the case. For example, even when the vehicle's position is determined with accuracy, the direction of travel of the vehicle may be incorrect since it is based on the assumption that the vehicle will move in the same direction as it has been traveling. Thus, if the vehicle is in the process of turning or has turned at, street C or street D, the correction to the drift of the gyroscope will be wrong. The error in drift will then continue to compound until such time that a sufficient number of positions have been determined so as to establish a new travel path.

Orientation is also a problem in surveying using optical sighting systems. Though optical sighting systems provide good data with regard to the orientation of a marker or an object relative to a reference site, the orientation of the reference site is typically not known with accuracy. For example, though the use of a plumb-bob for determining the levelness of the optical instrument can provide a rough vertical orientation (attitude), such a measurement does not provide the accuracy required for many applications. With reference to azimuthal orientation, a compass is typically used to obtain an orientation to true north. The azimuthal reference obtained by the use of a compass is also inexact due to variations in the earth's magnetic field and magnetic deviation due to surrounding metal and electrical objects and devices. The height of the position is also unknown with any degree of accuracy unless references having a known height are nearby.

Recently position determination systems such as GPS have been used for orienting optical surveying systems. However multiple GPS systems are required to determine orientation and each GPS system must be able to accurately determine position in order to determine a sufficiently accurate height and a reference attitude and azimuthal orientation.

What is needed is an accurate orientation system. In particular, a orientation system is required which accurately determines orientation and position when satellite signals are blocked or are inaccurate. In addition, an orientation system which can orient an optical surveying system when satellite signals are blocked or are inaccurate is required. In addition, an orientation system that can work in conjunction with a position determination system to provide orientation as a supplement to GPS data is needed.

DISCLOSURE OF THE INVENTION

The present invention meets the above need with a vehicle navigation system and an orientation system which sight a celestial reference for determining azimuthal and vertical orientation.

In one embodiment of the present invention a solar sighting system is used to obtain azimuthal and vertical orientation for use in a vehicle navigation system. The solar sighting system is used to sight the moon and/or one or more stars when the sun is either obscured or is not in view.

A vehicle navigation system is disclosed which includes a vehicle position determination system, a data storage device, a display device and a solar sighting system. A map database is stored in the data storage device. The map database includes information on roadways which run through a particular geographic area.

The position determination system includes an antenna which receives position signals such as ephemerides broadcast from satellites of the US Global Positioning System (GPS). The GPS includes a constellation of GPS satellites, each of which broadcast ephemerides. The elapsed time of flight for each satellite's signals to reach the GPS receiver antenna, together with the ephemerides from multiple satellites is received and the data is processed by the position determination system to determine the location of the vehicle. A useful discussion of the GPS and techniques for obtaining position information from the satellite signals is found in Tom Logsdon, The Navstar Global Positioning System, Van Nostrand Reinhold, 1992, pp. 17–90, incorporated by reference herein. Reference to a Global Positioning System or GPS herein refers to a Global Positioning System, to a Global Orbiting Navigation System, and to any other compatible satellite based system that provides information by which an observers position and/or the time of observation can be determined.

The location of the vehicle is compared to the data stored in map database and to prior calculations of the location of the vehicle so as to determine the direction of travel, the travel path and the location along the travel path corresponding to the vehicle's current location. Once the travel path and location along the travel path are determined, the location of the vehicle and the direction of travel are displayed. This display includes the display of a map and the travel path on which the vehicle is traveling, the location of the vehicle along the travel path and the direction of travel. The display is updated as the vehicle moves.

The solar sighting system is used to determine azimuthal orientation which is input into the vehicle navigation system. The azimuthal orientation is used to determine the direction of travel of the vehicle and to identify changes in the direction of travel of the vehicle. Thus, the vehicle navigation system of the present invention provides a more accurate determination of travel path and direction of travel than prior art systems when there is an unobstructed view of the sun.

The solar sighting system is also used to correctly determine position when the accuracy of the GPS system is reduced. For example, when the number of satellite vehicles is insufficient to determine position with the needed accuracy, azimuthal orientation data and vertical attitude is input into the position determination equation in order to accurately determine position. Other situations where it may be desirable to use solar sighting data in the determination of position include situations where selective availability and atmospheric conditions introduce inaccuracies into the position determination process.

In another embodiment, a solar sighting system is incorporated into a vehicle navigation system that includes a dead reckoning system. The solar sighting system provides an accurate measurement of azimuthal orientation which is then used to determine direction of travel. The known direction of travel can then be used to determine location and to correct for gyroscopic drift.

In one embodiment, a solar sighting system is coupled to a position determination system for accurately determining orientation. In one embodiment of the present invention the determined orientation is used in an optical surveying system to improve accuracy.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
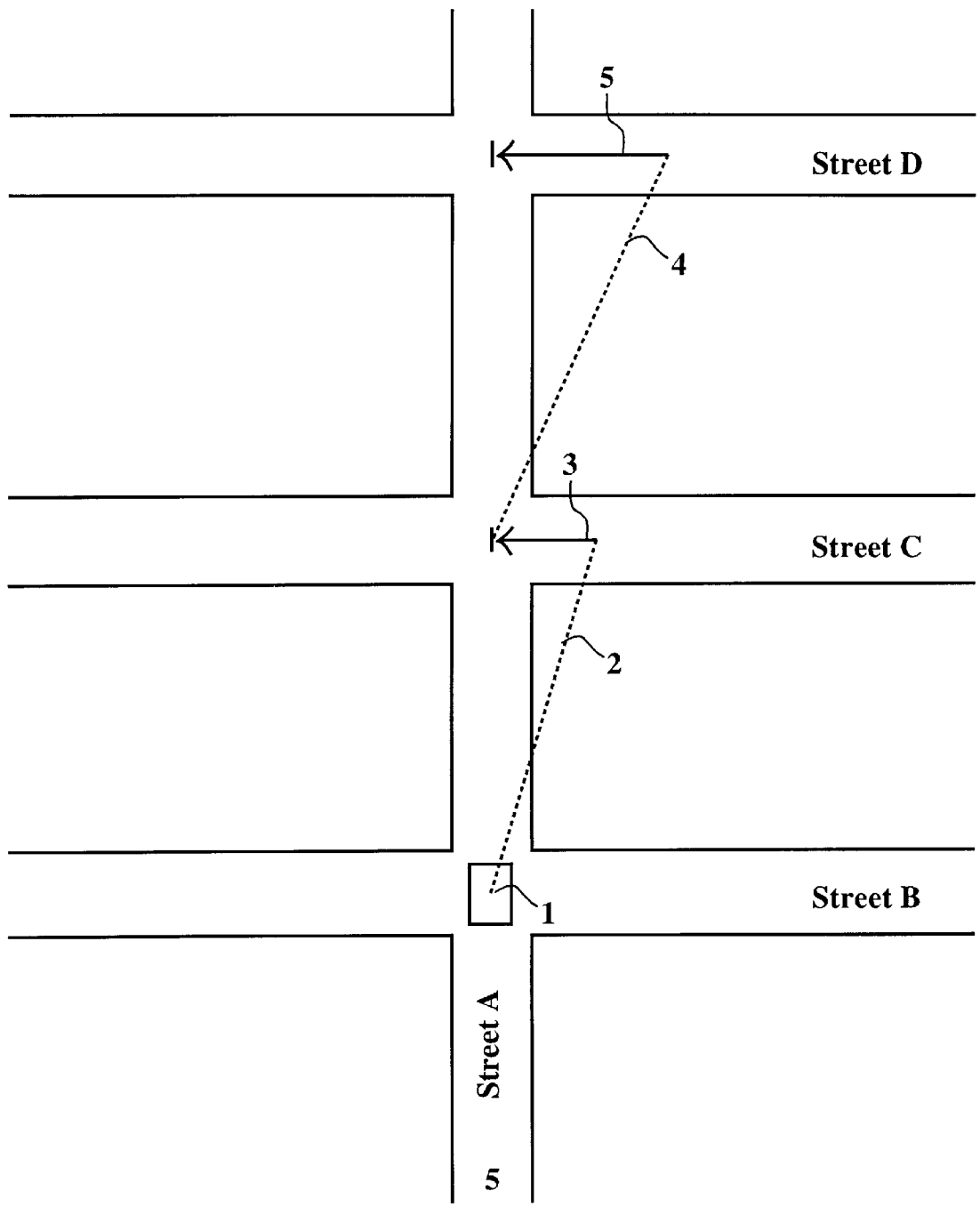
FIG. 1(Prior Art) is a diagram illustrating position determination using a prior art dead reckoning system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 2:
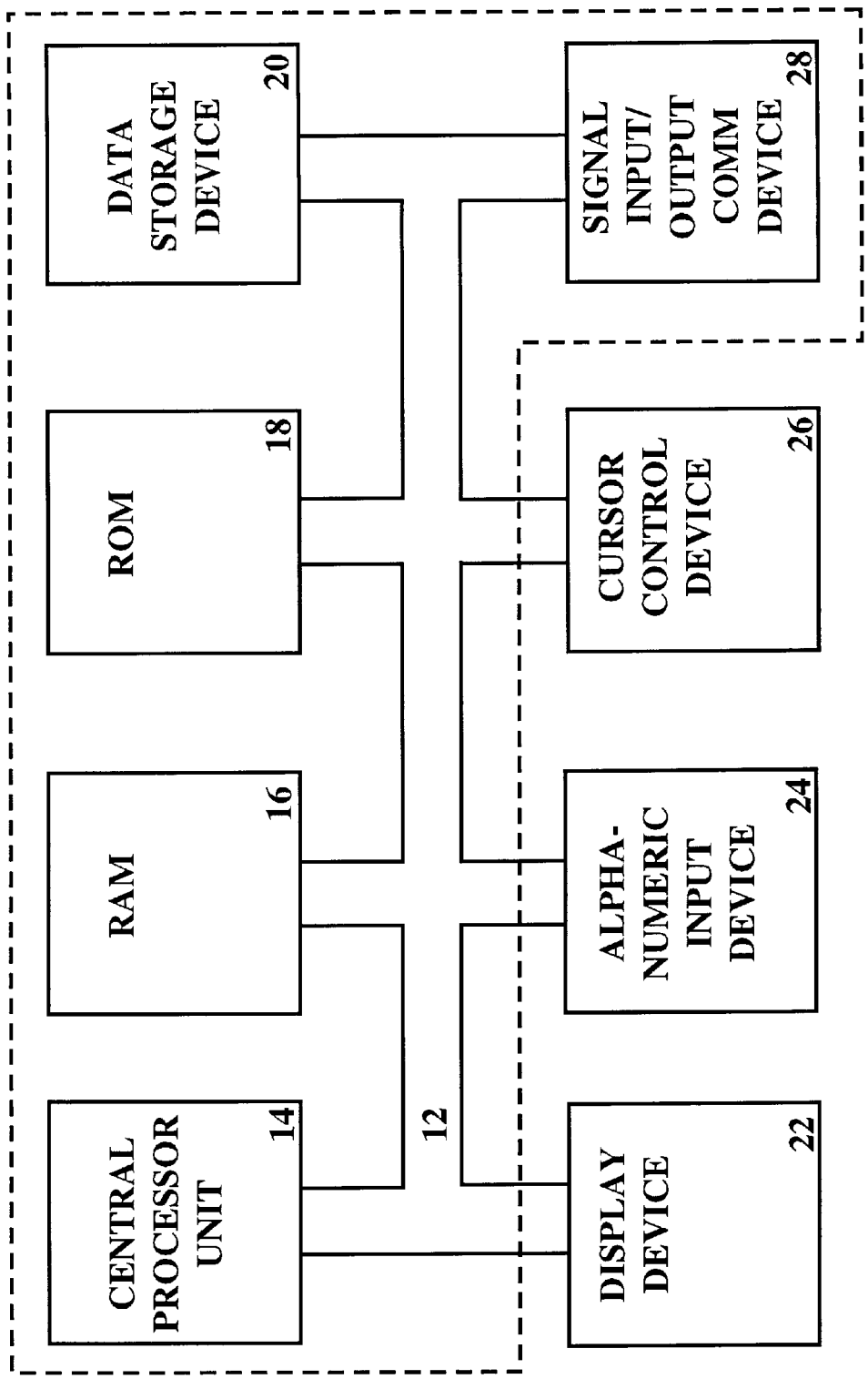
FIG. 2 is a diagram illustrating an exemplary computer system in accordance with the present invention.

With reference now to FIG. 2, portions of the present simplified location display system are comprised of computer executable instructions which reside in a computer system. FIG. 2 illustrates an exemplary computer system 10 used as a part of a vehicle navigation system and orientation system in accordance with the present invention. It is appreciated that the computer system 10 of FIG. 2 is exemplary only and that the present invention can operate within a number of different computer systems other than computer system 10 shown in FIG. 2, including general purpose computers systems, embedded computer systems, and stand alone computer systems specially adapted for automatically monitoring and determining the position of a vehicle relative to a given geographic database.

Computer system 10 of FIG. 2 includes an address/data bus 12 for communicating information, a central processor unit 14 coupled to bus 12 for processing information and instructions. Computer 10 also includes data storage features such as a random access memory (RAM) 16 coupled to bus 12 for storing information and instructions for central processor unit 14, a read only memory (ROM) 18 coupled to bus 12 for storing static information and instructions for the central processor unit 14, and a data storage device 20 (e.g., a magnetic or optical disk and disk drive) coupled to bus 12 for storing information and instructions. Display device 22 is coupled to bus 12 for displaying information. An alphanumeric input device 24 including alphanumeric and function keys is coupled to bus 12 for communicating information and command selections to central processor unit 14. Cursor control device 26 is coupled to bus 12 for communicating user input information and command selections to central processor unit 14, and a signal input output communication device 28 (e.g. a modem) coupled to bus 12.

Display device 22 of FIG. 2 of the present invention, may be a liquid crystal device, cathode ray tube, or other display device suitable for creating alphanumeric characters and/or graphics recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 3:
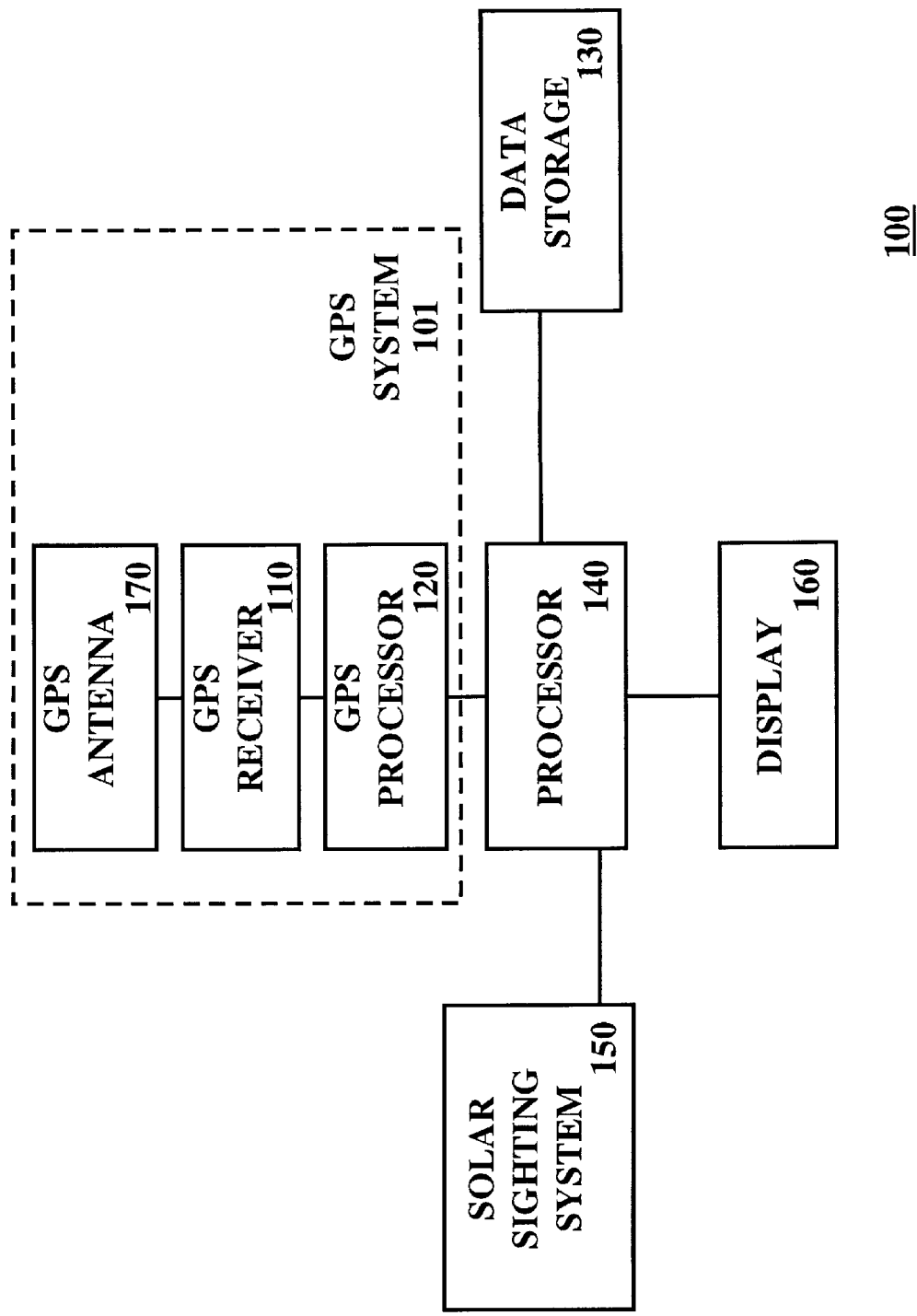
FIG. 3 is a diagram showing a navigation system in accordance with the present invention.

FIG. 3 is a logical representation of components vehicle navigation system 100 in accordance with one embodiment of the present invention. Vehicle navigation system 100 may be placed in a vehicle such as a car or a truck. In one embodiment, vehicle navigation system 100 includes a position determination system which is a GPS system, shown as GPS system 101. The position determining signals from satellites of the US Global Positioning System (GPS) are received by GPS receiver 110. These position determining signals include ephemeris data for satellites and time such that signal time of flight from each satellite is measured. GPS receiver 110 may have an internal antenna or may be linked to an external antenna such as GPS antenna 170. GPS receiver 110 is coupled to position signal processing circuitry located in GPS processor 120. Position signal processing circuitry in GPS processor 120 determines the location of GPS receiver 110 by analysis of the ephemerides and time of flight. Position signal processing circuitry in GPS receiver 110 can also determine the direction of movement of the vehicle by comparing calculated positions as the vehicle moves. Processor 140 receives the location coordinates and direction of travel from GPS receiver 110 and compares the location coordinates and direction of travel to the data in a map database stored in data storage device 130. Processor 140 is coupled to GPS processor 120 and to data storage device 130. In one embodiment of the present invention processor 140 is a standard computer microprocessor such as a 68000 series RISC chip manufactured by Motorola Corporation and data storage device 130 is a non-volatile storage medium such as non-volatile memory device. Alternatively, other types of memory storage devices such as flash memory, tape, CD ROM, or DVD may be used.

With reference again to FIG. 3, display 160 is also electrically coupled to processor 140. In one embodiment, display 160 is a two line, back lit, liquid matrix alphanumeric display. Alternatively, other types of displays such as cathode ray tube displays, active matrix liquid crystal displays and other types of displays could be used.

Although the present invention is described with reference to the use of satellites of the US Global Positioning System to determine position, any of a number of other systems such as GLONASS or LORAN or other systems could also be used to determine position.

Figure 4:
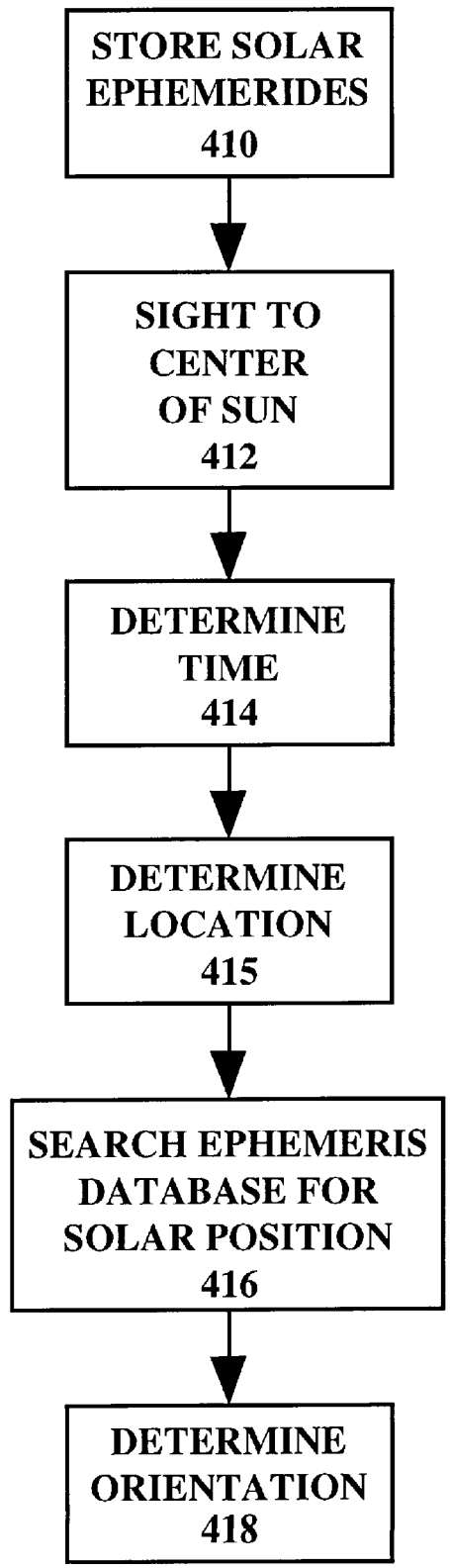
FIG. 4 is a diagram showing a method for determining orientation in accordance with the present invention.

With reference to step 410 of FIG. 4, a solar ephemeris database is stored in data storage device 130 of FIG. 3. The solar ephemeris database includes the coordinates corresponding to the position of the center of the sun for specific times.

In operation, a solar sighting is performed as shown by step 412. When a solar sighting is to be performed, the solar sighting system determines the location of the center of the sun with reference to a designated coordinate system.

Continuing with FIG. 4, time is determined as is shown by step 414. Since satellites of the GPS system transmit highly accurate time measurements, time measurements received through GPS receiver 110 of FIG. 3 are used whenever available. Typically GPS satellite broadcasts also include clock error which is used to correct the broadcasted time. When a recent time measurement is not available, the time determined by an internal clock may be used. Preferably, the time indicated by the internal clock is updated as necessary depending on the time indicated by received satellites.

Location is determined as shown in step 415. In one embodiment, location is determined using location determination information received from the satellites of the US global positioning system. Location may be determined using any of a number of known methods.

Next, as shown by step 416, the ephemeris database is searched to find the ephemeris data corresponding to the time determined in step 414 and the position determined in step 415. Orientation is then determined as shown in step 418. In one embodiment, the coordinates of the sun contained in the ephemeris data for the time determined in step 414 are compared to the calculated position of the sun determined in step 412 using an algorithm that takes into account the position determined in step 415. In one embodiment, orientation is determined using a computation of the angle between a front reference point and the calculated location of the sun for the position determined in step 415. In one embodiment the front reference point is the front of the solar sighting system. Orientation is calculated so as to determine an azimuthal orientation and a vertical orientation.

In the embodiment shown in FIG. 3, the orientation data is used to determine the direction of travel of the vehicle. In particular the azimuthal orientation The direction of travel of the vehicle is then displayed on a display such as display 160. Since only azimuthal orientation is necessary in order to determine direction of movement, only azimuthal orientation data is used by processor 140 of FIG. 3 to determine the direction of travel.

In one embodiment position signal processing circuitry in GPS processor 120 of FIG. 3 determines the location of the vehicle by analysis of the time of flight and ephemerides received from satellites by GPS receiver 110 of FIG. 3. Position signal processing circuitry in GPS receiver 110 of FIG. 3 can also determine the direction of movement of the vehicle by comparing time of flight and ephemerides received from satellites at subsequent positions as the vehicle moves. Processor 140 of FIG. 3 receives the location coordinates corresponding to the position of the vehicle and compares the position of the vehicle to the data in a stored map database so as to determine the travel path of the vehicle and the location of the vehicle along the travel path.

The method for determining the path of the vehicle and the location of the vehicle along the travel path varies depending on the map database used. In one embodiment of the present invention, the name of the travel path along which the vehicle is traveling is determined with reference to a map database published by Etak Corporation of Menlo Park, Calif., or TIGER files, available through the US Census Bureau. The determination of the closest travel path is obtained by using any number of known, commercially available software programs. For example, when using an Etak map database, as a map database, a software program such as, Map Info, manufactured by Map Info Corporation of Troy, N.Y., could be used to identify the closest map segment to a particular vehicle location.

Figure 5:
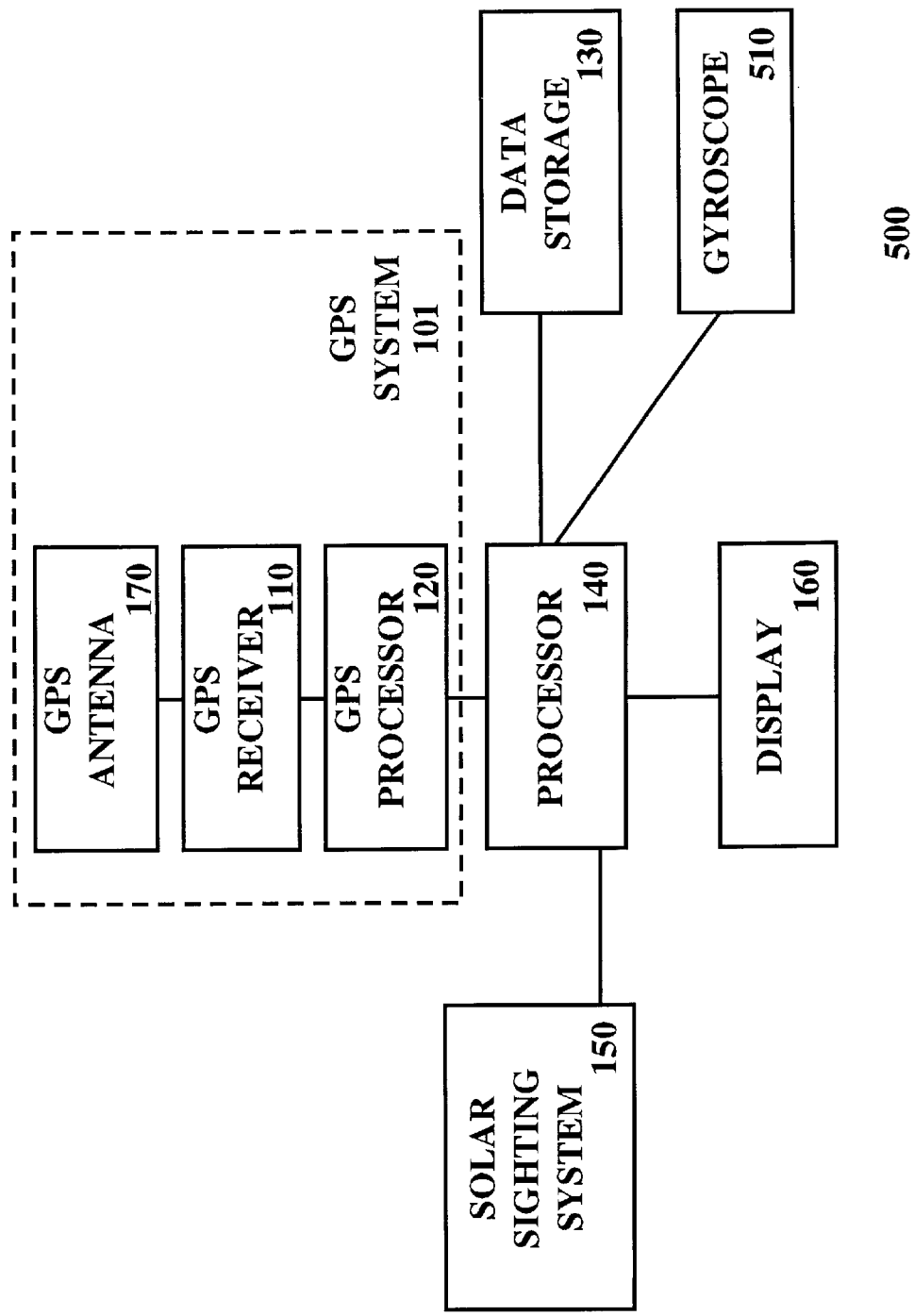
FIG. 5 is a diagram showing a navigation system that includes a gyroscope in accordance with the present invention.

In a second embodiment which is illustrated in FIG. 5, vehicle navigation system 500 is shown to include a gyroscope 510 in addition to the navigation system components of navigation system 100 shown in FIG. 3. Gyroscope 510 indicates direction and may be reset as required to compensate for gyroscopic drift. In this embodiment, orientation data is used both to determine direction of travel and to reset the gyroscope 510 to compensate for gyroscopic drift.

Figure 6:
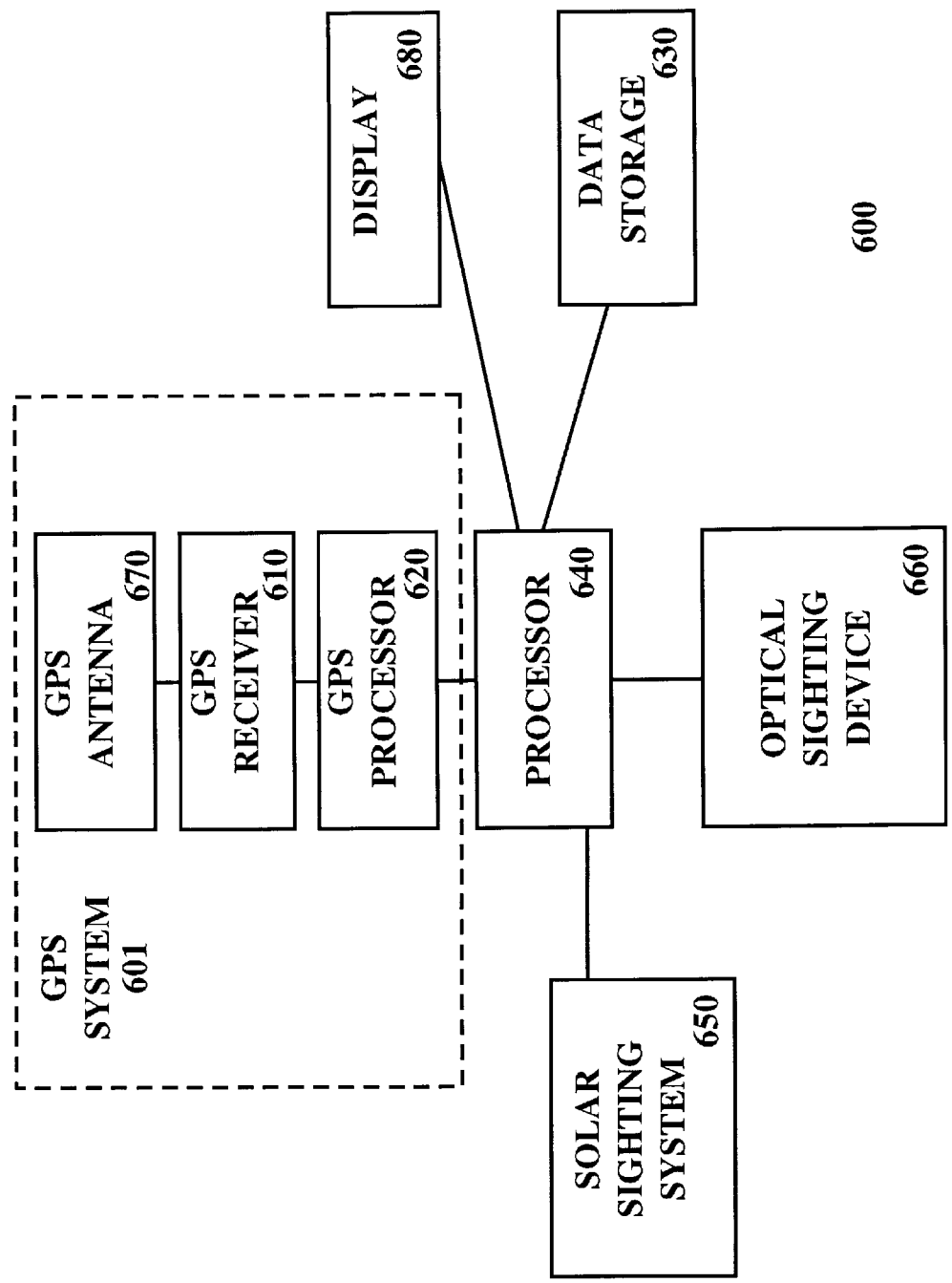
FIG. 6 is a diagram showing an orientation system coupled to a optical sighting device in accordance with the present invention.

In another embodiment which is illustrated in FIG. 6, orientation data from a solar sighting system is used to orient an optical sighting device. FIG. 6 shows optical sighting system 660 to include optical sighting device 660. In one embodiment, optical sighting device 660 is a electronic range finder which also determines azimuth and vertical attitude. Alternatively, a survey system which simply determines azimuth and vertical attitude could also be used. GPS system 601 is shown to include GPS receiver 610 and GPS processor 620. GPS system 601 is connected to processor 640 which may be a microprocessor or may be a general purpose computer such as computer 10 shown in FIG. 2. Processor 640 is also connected to display 680 and data storage 630. In one embodiment, data storage 630 is a non volatile data storage device and solar ephemeris database 410 of FIG. 4 would be stored in data storage 630.

In the embodiment shown in FIG. 6. time and position is obtained from satellite broadcasts received by GPS system 601. Once orientation is determined as shown by step 418 of FIG. 4, orientation data is used to orient optical sighting device 660. In one embodiment, orientation information is displayed on display 680 which is used to manually orient optical sighting device 660. Alternatively, the orientation data displayed on display 680 could be manually recorded for later use. Also, orientation data displayed on display 680 could be electronically input into optical sighting device 660. Alternatively, orientation data may be used to calibrate a compass (not shown). When multiple GPS systems are used to determine orientation, orientation data may be used to augment and verify GPS orientation and elevation data.

The embodiments shown in FIGS. 1–6 are shown to use a solar sighting system to determine the location of the sun. The solar sighting systems may be one or more light sensing devices which determine the position of the center of the sun using well known techniques. Preferably an automated solar sighting system is used which automatically determines the position of the center of the sun on being activated, and which periodically determines the position of the sun as required for a particular application. In one embodiment of the present invention a solar sighting system which uses a TSL230 differential sun sensor is used. The TSL230 Sun Sensor is manufactured by Texas Instruments, Inc. of Dallas, Tex. In one embodiment of the present invention, a TSL230 sun sensor is used in conjunction with a microcontroller which may be a 8031 microcontroller, manufactured by Intel Corporation of Sunnyvale, Calif. In this embodiment, a system such as the solar sighting system developed by Stanford University in Project DogStar is used. The system developed by Stanford University is incorporated herein by reference.

The light sensing devices of the solar sighting system are also adaptable for determining the location of the moon and one or more stars using known techniques. Solar sighting systems are commonly used in satellites and lunar and stellar sighting systems are typically used for locating astronomical telescopes and measuring devices. When position is to be determined using a sighting of the moon, the method shown in FIG. 4 is used to determine orientation. The only differences are that a lunar ephemeris is stored instead of a solar ephemeris in step 410 and that the sighting is to the center of the moon instead of the center of the sun as shown in step 412. The search performed in step 416 is a search of the lunar ephemeris database. When using a lunar sighting, orientation is determined by comparing the calculated position of the moon determined in step 412 with the lunar position in the lunar ephemeris database for the designated time in conjunction with the position.

When position is to be determined using a sighting of a star, the method shown in FIG. 4 is used to determine orientation. The only differences are that a stellar ephemeris is stored instead of a solar ephemeris in step 410 and that the sighting is to the star instead of the center of the sun as shown in step 412. The search performed in step 416 is a search of the stellar ephemeris database. When using a stellar sighting, orientation is determined by comparing the calculated position of the star determined in step 412 with the stellar position in the stellar ephemeris database for the designated time in conjunction with the position.

Orientation using the method shown in FIG. 4 may also be used to determine position. The calculated position of the sun determined in step 412 and the solar position in the solar ephemeris database for the designated time is input into the equation for calculation of position using position determination data. Thus, position may be determined in situations where location determination using conventional GPS techniques is either impossible or accuracy is reduced. Such situations include the situation where sufficient satellite vehicles are not being received, or when selective availability or atmospheric conditions reduce accuracy.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a computer system including a processor coupled to a bus, and a data storage device coupled to said bus for storing information, a computer implemented method for determining orientation of a navigation system comprising the steps of:

storing solar ephemeris data representing the location of the sun at specific times in said data storage device;

determining position of said navigation system using a position determination system and coupling the determined position to said processor;

determining time using said position determination system and coupling the time to said processor;

calculating the position of the sun using a solar sighting system; and calculating orientation of said navigation system based on said determined position using the calculated position of the sun and the solar ephemeris data for the determined time.

2. The computer implemented method of claim 1 wherein said calculated orientation further comprises the determination of azimuthal orientation and vertical orientation.

3. The computer implemented method of claim 2 wherein said step of determining position is performed using position determination signals received from satellites of the US global positioning system.

4. The computer implemented method of claim 2 wherein said step of determining time is performed using position determination signals received from satellites of the US global positioning system.

5. The computer-implemented method of claim 1 further comprising the steps of:

storing lunar ephemeris data representing the position of the moon at specific times in said data storage device;

calculating the position of the moon using said solar sighting system and coupling the position of the moon to said processor;

determining the time of the calculation of the position of the moon and coupling the time to said processor;

determining position of said navigation system at the time of the calculation of the position of the moon and coupling the position of said navigation system to said processor; and calculating orientation of said navigation system using the calculated position of the moon and the position of the moon in said lunar ephemeris database for the determined time and the determined position of said navigation system.

6. The computer-implemented method of claim 1 further comprising the steps of:

storing stellar ephemeris data representing the position of a star at specific times in said data storage device;

calculating the position of a star using said solar sighting system and coupling the position of said star to said processor;

determining position of said navigation system at the time of the calculation of the position of said star and coupling the position of said navigation system to said processor;

determining the time of the calculation of the position of the star and coupling the time to said processor; and calculating orientation of said navigation system using the calculated position of said star, and the coordinates corresponding to the position of said star in said stellar ephemeris database for the determined time and for the determined position of said navigation system.

7. A vehicle navigation system comprising:

a receiver for receiving position determining signals from satellites;

position signal processing circuitry coupled to said receiver for analyzing position determining signals so as to determine the position of said receiver;

a data storage device for storing solar ephemeris information, said solar ephemeris information including location coordinates corresponding to the location of the sun at particular times;

a solar sighting system for determining the position of the sun;

a processing device coupled to said position signal processing circuitry for receiving said position of said receiver, said processing device coupled to said data storage device for calculating the direction of travel of said vehicle based on said position of said receiver using the position of the sun and the solar ephemeris data; and a display device coupled to said processing device for displaying the direction of travel of said vehicle.

8. The vehicle navigation system of claim 7 wherein said vehicle is traveling along a travel path and wherein said vehicle navigation system further comprises a map database stored in said data storage device, and wherein said processing device determines the travel path using the direction of travel of said vehicle and the position of said vehicle.

9. The vehicle navigation system of claim 8 wherein said processor also determines direction of travel using multiple determinations of the position of said vehicle.

10. The vehicle navigation system of claim 9 further comprising a gyroscope, said gyroscope also used to determine direction of travel of said vehicle.

11. The vehicle navigation system of claim 7 wherein said processing device further comprises a microprocessor.

12. The vehicle navigation system of claim 11 wherein said memory storage device comprises a non-volatile memory storage device.

13. The vehicle navigation system of claim 11 wherein said solar sighting system includes provision for sighting the moon when the sun is not visible.

14. The vehicle navigation system of claim 11 wherein solar sighting system includes provision for sighting a star when the sun is not visible.

15. In a computer system including a processor coupled to a bus, a display, and a data storage device coupled to said bus for storing information, a computer implemented method for indicating the direction of travel of a vehicle, said computer-implemented method comprising the steps of:

storing solar ephemeris data representing the position of the sun at specific times in said data storage device, said solar ephemeris data including coordinates corresponding to the position of the sun at specific times;

calculating the position of the sun and coupling the position of the sun to said processor;

determining position of the vehicle and coupling the position of the vehicle to said processor;

determining the time and coupling the time to said processor;

calculating the direction of travel of the vehicle based on said determined position of the vehicle using the calculated position of the sun and the coordinates corresponding to the position of the sun in said solar ephemeris database for the determined time; and indicating the direction of travel of the vehicle on said display.

16. The computer-implemented method of claim 15 further comprising the steps of:

storing a map database representing travel paths within a geographic region in said data storage device;

determining the travel path of said vehicle by comparing the position of said vehicle and the direction of travel of said vehicle to travel paths in said map database; and indicating the travel path of said vehicle on said display.

17. The computer-implemented method of claim 16 further comprising the step of storing lunar ephemeris data representing the position of the moon at specific times in said data storage device, said lunar ephemeris data including coordinates corresponding to the position of the moon at specific times;

calculating the position of the moon using said solar sighting system and coupling the position of the moon to said processor;

determining the time of the calculation of the position of the moon and coupling the time to said processor;

determining position at the time of the calculation of the position of the moon and coupling the position to said processor; and calculating the direction of travel of said vehicle using the calculated position of the moon, and the coordinates corresponding to the position of the moon in said lunar ephemeris database for the determined time, and the determined position.

18. The computer-implemented method of claim 15 further comprising the step of storing a stellar ephemeris database representing the position of a star at specific times in said data storage device, said stellar ephemeris database including coordinates corresponding to the position of a star at specific times;

calculating the position of a star using said solar sighting system and coupling the position of said star to said processor;

determining position at the time of the calculation of the position of said star and coupling the position to said processor;

determining the time of the calculation of the position of the star and coupling the time to said processor; and calculating the direction of travel of said vehicle using the calculated position of said star, and the coordinates corresponding to the position of said star in said stellar ephemeris database for the determined time, and the determined position.

19. The computer implemented method of claim 15 wherein said step of determining the time further comprises using satellite data received from satellites of the US global positioning system to determine the time.

20. The computer implemented method of claim 15 wherein said step of determining the position of the sun includes the step of sighting the sun using a solar sighting system.

* * * * *